US011011953B2

(12) United States Patent
Takii

(10) Patent No.: US 11,011,953 B2
(45) Date of Patent: May 18, 2021

(54) MOTOR AND LAMP USING THE SAME

(71) Applicant: KOITO MANUFACTURING CO., LTD., Tokyo (JP)

(72) Inventor: Naoki Takii, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/229,347

(22) Filed: Dec. 21, 2018

(65) Prior Publication Data

US 2019/0207464 A1 Jul. 4, 2019

(30) Foreign Application Priority Data

Dec. 28, 2017 (JP) .............. JP2017-254266

(51) Int. Cl.
*H02K 5/10* (2006.01)
*H02K 21/22* (2006.01)
*H02K 7/08* (2006.01)
*H02K 11/33* (2016.01)
*H02K 3/52* (2006.01)
(Continued)

(52) U.S. Cl.
CPC .............. *H02K 5/10* (2013.01); *F21S 41/675* (2018.01); *H02K 1/278* (2013.01); *H02K 3/522* (2013.01); *H02K 7/085* (2013.01); *H02K 11/33* (2016.01); *H02K 21/22* (2013.01); *F21S 41/141* (2018.01); *F21S 41/25* (2018.01); *H02K 5/1732* (2013.01);
(Continued)

(58) Field of Classification Search
CPC .......... H02K 7/00; H02K 15/02; H02K 21/22; H02K 7/14; H02K 15/14

USPC .. 310/90, 91, 156.12, 156.26, 215, 216.012, 310/156.08, 402, 407, 156.11
See application file for complete search history.

(56) References Cited

U.S. PATENT DOCUMENTS 3,644,066 A * 2/1972 Heob .................... F04D 29/547
417/354
3,663,849 A * 5/1972 Heob ................... H02K 5/1675
310/90
(Continued)

FOREIGN PATENT DOCUMENTS

CN    2899247 Y    5/2007
CN    202309304 U   7/2012
(Continued)

OTHER PUBLICATIONS

Machine Translation JP63007149 (Year: 1988).*
(Continued)

*Primary Examiner* — Jose A Gonzales Quinones
(74) *Attorney, Agent, or Firm* — Sughrue Mion, PLLC

(57) ABSTRACT

A motor includes a shaft member in which at least a part of an outer peripheral surface is made of metal, a magnet unit which is configured by integrating a plurality of magnets and in which a press-fit hole into which the shaft member is press-fitted is formed, a substrate which is disposed at a predetermined distance from the magnet unit in an extending direction of the shaft member and to which electric power is supplied, and a protective member in which a through-hole into which the shaft member is inserted is formed and which is disposed between the magnet unit and the substrate in the extending direction of the shaft member. In the motor, the protective member is in contact with at least a part of the outer peripheral surface of the shaft member.

13 Claims, 6 Drawing Sheets

(51) Int. Cl.
*H02K 1/27* (2006.01)
*H02K 5/173* (2006.01)
*H02K 29/10* (2006.01)
*H02K 11/22* (2016.01)
*F21S 41/675* (2018.01)
*F21S 41/25* (2018.01)
*F21S 41/141* (2018.01)

(52) U.S. Cl.
CPC ............ *H02K 5/1735* (2013.01); *H02K 11/22* (2016.01); *H02K 29/10* (2013.01)

(56) References Cited

U.S. PATENT DOCUMENTS

| | | | | |
|---|---|---|---|---|
| 6,206,527 | B1* | 3/2001 | Suzuki | G02B 7/24 359/856 |
| 6,259,343 | B1* | 7/2001 | Schwarz | H01F 7/0215 335/302 |
| 6,376,946 | B1* | 4/2002 | Lee | H02K 5/1675 310/254.1 |
| 6,943,471 | B2* | 9/2005 | Toyokawa | H02K 5/1675 310/67 R |
| 9,018,814 | B2* | 4/2015 | Watanabe | H02K 5/173 310/90 |
| 2003/0146668 | A1* | 8/2003 | Sun | F04D 29/058 310/90.5 |
| 2003/0156366 | A1* | 8/2003 | Horng | H02K 5/1675 361/23 |
| 2007/0024137 | A1* | 2/2007 | Otsuki | F04D 29/58 310/90 |
| 2009/0261674 | A1* | 10/2009 | Horng | F16C 17/04 310/91 |
| 2013/0106221 | A1 | 5/2013 | Horng | |
| 2013/0187499 | A1* | 7/2013 | Watanabe | H02K 5/1735 310/90 |
| 2013/0200738 | A1* | 8/2013 | Horng | H02K 5/1735 310/90 |
| 2015/0091402 | A1* | 4/2015 | Kim | H02K 5/225 310/71 |
| 2017/0179784 | A1* | 6/2017 | Nishidate | H02K 7/081 |
| 2017/0302127 | A1* | 10/2017 | Sakuragi | H02K 5/22 |

FOREIGN PATENT DOCUMENTS

| | | | |
|---|---|---|---|
| CN | 202772705 U | | 3/2013 |
| CN | 104795935 A | | 7/2015 |
| JP | 63007149 A | * | 1/1988 |
| JP | 4-295244 A | | 10/1992 |
| JP | 2001331040 A | * | 11/2001 |
| JP | 2004254394 A | * | 9/2004 |

OTHER PUBLICATIONS

Machine Translation JP2004254394 (Year: 2014).*
Machine Translation JP2001331040 (Year: 2001).*
Communication dated Aug. 5, 2020, from the China National Intellectual Property Administration in Application No. 201811601263.2.

* cited by examiner

MOTOR AND LAMP USING THE SAME

CROSS-REFERENCE TO RELATED APPLICATIONS

The present application claims the benefit of priority of Japanese Patent Application No. 2017-254266, filed on Dec. 28, 2017, the content of which is incorporated herein by reference.

TECHNICAL FIELD

The disclosure relates to a motor and a lamp using the motor. Specifically, the disclosure relates to a motor capable of suppressing malfunction and a lamp using the motor.

BACKGROUND

Motors are used in various devices for domestic or business use. For example, a motor which includes a shaft, a bracket, a coil part having a core, an insulator and a winding, and a substrate having a motor drive circuit mounted thereon is disclosed in JP-A-Hei-4-295244. In the motor disclosed in JP-A-Hei-4-295244, the shaft is rotatably supported by the bracket, the coil part is fixed to the bracket in a state where the bracket is inserted into a through-hole formed in the core, and the substrate is fixed to the bracket at a predetermined distance from the core in an extending direction of the shaft.

By the way, when fixing the coil part to the bracket in a state where the bracket is inserted into the through-hole formed in the core as in the motor disclosed in JP-A-Hei-4-295244, it is general that the core is fixed to the bracket by press-fitting the bracket into the through-hole of the core. When the bracket is press-fitted into the through-hole of the core in this way, an outer peripheral surface of the bracket and an inner peripheral surface defining the through-hole of the core are scraped, and shavings of these surfaces may be generated in some cases.

It is known that a core of a motor is formed of metal. Further, a shaft and a bracket are generally formed of metal from the viewpoint of suppressing vibration or the like during rotation of the shaft and improving durability. Therefore, the shavings are also generally made of metal, and there is a concern that the shavings come into contact with conductive wires or the like of a substrate and a short circuit occurs.

SUMMARY

Accordingly, an aspect of the present disclosure provides a motor which can suppress malfunction and a lamp using the motor.

According to an embodiment of the present disclosure, there is provided a motor including:

a shaft member in which at least a part of an outer peripheral surface is made of metal;

a magnet unit which is configured by integrating a plurality of magnets and in which a press-fit hole into which the shaft member is press-fitted is formed;

a substrate which is disposed at a predetermined distance from the magnet unit in an extending direction of the shaft member and to which electric power is supplied; and a protective member in which a through-hole into which the shaft member is inserted is formed and which is disposed between the magnet unit and the substrate in the extending direction of the shaft member, wherein the protective member is in contact with at least a part of the outer peripheral surface of the shaft member.

According to the motor including the above configuration, the protective member is disposed between the magnet unit and the substrate in the extending direction of the shaft member, and the protective member is in contact with at least a part of the outer peripheral surface of the shaft member. Therefore, shavings generated when the shaft member is press-fitted into the press-fit hole of the magnet unit and the outer peripheral surface of the shaft member and the inner peripheral surface defining the press-fit hole of the magnet unit are scraped are received by the protective member, so that it is possible to prevent the shavings from contacting a conducting wire or the like of the substrate. In this way, the occurrence of a short circuit on the substrate caused by the shavings can be suppressed. For example, it is possible to suppress malfunction such as that the output shaft of the motor does not rotate. Meanwhile, the magnet includes, for example, a permanent magnet or an electromagnet. The substrate includes, for example, a substrate which supplies electric power to the windings of the electromagnet or a substrate on which a sensor for detecting the rotation of the motor is mounted.

In the above motor, the protective member is brought into close contact with the outer peripheral surface of the shaft member by an elastic force.

According to the motor including the above configuration, even when the protective member is deformed due to heat or aged deterioration or the like, the formation of a gap between the protective member and the outer peripheral surface of the shaft member can be suppressed by the deformation of the protective member, and the occurrence of a short circuit on the substrate caused by the shavings can be suppressed.

In the above motor, a diameter of the through-hole at an end opposite to the magnet unit may be larger than an outer diameter of the shaft member, and the protective member may have a tapered portion in which the diameter of the through-hole is reduced from the end opposite to the magnet unit toward the magnet unit.

In general, the dimensional accuracy on the outer peripheral surface of the member to be press-fitted, for example, the dimension accuracy such as roundness tends to be higher than the dimensional accuracy on the other portion, and the outer peripheral surface of the portion of the member to be press-fitted may be machined by cutting to improve the dimensional accuracy on the outer peripheral surface of the portion. When the outer peripheral surface of the portion to be press-fitted is machined by cutting in this manner, the diameter of the portion to be press-fitted is smaller than those of the other portions, and thus, a step is formed on the outer peripheral surface of the member. Generally, when a member having such a step is inserted into a through-hole of another member, the step tends to make it difficult to insert the member into the through-hole. However, in this motor, as described above, the diameter of the through-hole at the end opposite to the magnetic unit is larger than the outer diameter of the shaft member, and the protective member has a tapered portion in which the diameter of the through-hole is reduced from the end opposite to the magnetic unit toward the magnetic unit. Therefore, as compared to the case where the protective member does not have the tapered portion, when the shaft member in which the step is formed is inserted into the through-hole of the protective member as described above, it is difficult for the protective member to catch on the step and the shaft member can be easily inserted into the through-hole of the protective member. As a result, the productivity of the motor can be improved.

In the above motor, the protective member may have a collecting portion which surrounds the shaft member while spaced from the outer peripheral surface of the shaft member on the side of the magnet unit from the portion with which the outer peripheral surface of the shaft member is in contact, and in which an opening is formed at an end on the side of the magnet unit.

Since the collecting portion of the protective member surrounds the shaft member while spaced from the outer peripheral surface of the shaft member, a space is formed between the collecting portion and the shaft member. Further, since the opening is formed at the end of the collecting portion on the side of the magnet unit, the shavings can be trapped in the space between the collecting portion and the shaft member via the opening and can be retained in the space. Therefore, even when the output shaft or the like of the motor is rotated and the shavings are rolled up by this rotation, it is possible to prevent the shavings from contacting a conducting wire or the like of the substrate. As a result, as compared to the case where the shavings are not retained in the space, the occurrence of a short circuit on the substrate caused by the shavings can be further suppressed.

In the above motor, the substrate may overlap with the magnet unit as viewed from the extending direction of the shaft member.

According to another embodiment of the present disclosure, there is provided a motor including:

an output shaft:

a bearing part which is configured to rotatably support the output shaft and in which at least a part of an outer peripheral surface is made of metal;

a metallic core in which a press-fit hole into which the bearing part is press-fitted is formed;

a substrate which is disposed at a predetermined distance from the core in an extending direction of the output shaft and to which electric power is supplied; and a protective member in which a through-hole into which the bearing part is inserted is formed and which is disposed between the core and the substrate in the extending direction of the output shaft, wherein the protective member is in contact with at least a part of the outer peripheral surface of the bearing part.

According to the motor including the above configuration, the protective member is disposed between the core and the substrate in the extending direction of the output shaft, and the protective member is in contact with at least a part of the outer peripheral surface of the bearing part. Therefore, shavings generated when the bearing part is press-fitted into the press-fit hole of the core and the outer peripheral surface of the bearing part and the inner peripheral surface defining the press-fit hole of the core are scraped are received by the protective member, so that it is possible to prevent the shavings from contacting a conducting wire or the like of the substrate. In this way, the occurrence of a short circuit on the substrate caused by the shavings can be suppressed. For example, it is possible to suppress malfunction such as that the output shaft of the motor does not rotate. Meanwhile, the substrate includes, for example, a substrate which supplies electric power to the windings of the electromagnet or a substrate on which a sensor for detecting the rotation of the motor is mounted.

When the bearing part is press-fitted into the press-fit hole of the core as described above, the protective member may be brought into close contact with the outer peripheral surface of the bearing part by an elastic force.

According to the motor including the above configuration, even when the protective member is deformed due to heat or aged deterioration or the like, the formation of a gap between the protective member and the outer peripheral surface of the bearing part can be suppressed by the deformation of the protective member, and the occurrence of a short circuit on the substrate caused by the shavings can be suppressed.

When the bearing part is press-fitted into the press-fit hole of the core as described above, a diameter of the through-hole at an end opposite to the core may be larger than an outer diameter of the bearing part, and the protective member may have a tapered portion in which the diameter of the through-hole is reduced from the end opposite to the core toward the core.

When a member having a step formed on the outer peripheral surface is inserted into a through-hole of another member as described above, the step tends to make it difficult to insert the member into the through-hole. However, in this motor, as described above, the diameter of the through-hole at the end opposite to the core is larger than the outer diameter of the bearing part, and the protective member has a tapered portion in which the diameter of the through-hole is reduced from the end opposite to the core toward the core. Therefore, as compared to the case where the protective member does not have the tapered portion, when the bearing part in which the step is formed is inserted into the through-hole of the protective member as described above, it is difficult for the protective member to catch on the step and the bearing part can be easily inserted into the through-hole of the protective member. As a result, the productivity of the motor can be improved.

When the bearing part is press-fitted into the press-fit hole of the core as described above, the protective member may have a collecting portion which surrounds the bearing part while spaced from the outer peripheral surface of the bearing part on the side of the core from the portion with which the outer peripheral surface of the bearing part is in contact, and in which an opening is formed at an end on the side of the core.

Since the collecting portion of the protective member surrounds the bearing part while spaced from the outer peripheral surface of the bearing part, a space is formed between the collecting portion and the bearing part. Further, since the opening is formed at the end of the collecting portion on the side of the core, the shavings can be trapped in the space between the collecting portion and the bearing part via the opening and can be retained in the space. Therefore, even when the output shaft or the like of the motor is rotated and the shavings are rolled up by this rotation, it is possible to prevent the shavings from contacting a conducting wire or the like of the substrate. As a result, as compared to the case where the shavings are not retained in the space, the occurrence of a short circuit on the substrate caused by the shavings can be further suppressed.

When the bearing part is press-fitted into the press-fit hole of the core as described above, the protective member may be a part of an insulator formed of an insulating material covering at least a part of an end face of the core on the side of the substrate.

By adopting such a configuration, the protective member also serves as a part of the insulator. As a result, as compared to the case where the protective member and the insulator are formed separately, the number of parts can be reduced and the cost of the motor can be reduced.

In the above motor, the substrate may overlap with the core as viewed from the extending direction of the output shaft.

According to another embodiment of the present disclosure, there is provided a lamp including:
a light source;
a reflector; and
a motor configured to rotate the reflector,
wherein the reflector is configured to reflect light emitted from the light source while rotating, and
wherein the motor is the motor according to the configuration described above According to the lamp including the above configuration, it is possible to provide the motor capable of suppressing malfunction and the lamp using the motor.

DETAILED DESCRIPTION

Hereinafter, embodiments for carrying out a vehicle lamp according to the disclosure will described with reference to the accompanying drawings. The embodiments described below are intended for facilitating the understanding of the disclosure and are not intended to limit the disclosure. The disclosure can be modified and improved from the following embodiments without departing from the spirit thereof.

First Embodiment

Figure 1:
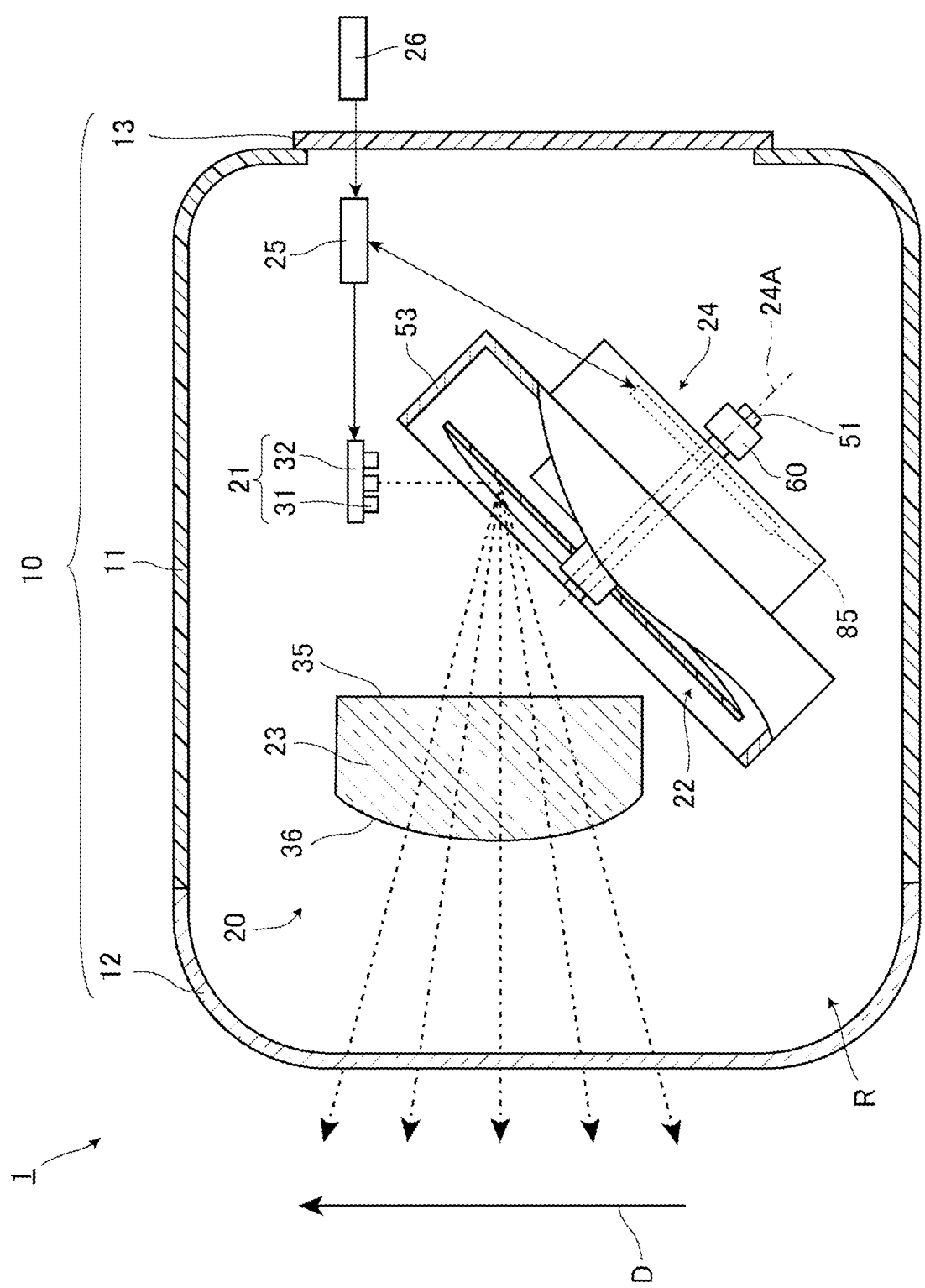
FIG. 1 is a view showing an example of a lamp according to a first embodiment of the disclosure.

FIG. 1 is a plan view showing an example of a lamp according to the present embodiment. Meanwhile, in FIG. 1, for ease of understanding, a part of the lamp is shown in a sectional view. In the present embodiment, the lamp is a vehicle headlamp 1. As shown in FIG. 1, the vehicle headlamp 1 of the present embodiment mainly includes a housing 10 and a lamp unit 20.

The housing 10 mainly includes a lamp housing 11, a front cover 12 and a back cover 13. The lamp housing 11 has a front opening. The front cover 12 is fixed to the lamp housing 11 so as to close the front opening. Further, an opening smaller than the front opening is formed at the rear of the lamp housing 11. The back cover 13 is fixed to the lamp housing 11 so as to close the rear opening.

A lamp chamber R is defined by the lamp housing 11, the front cover 12 closing the front opening of the lamp housing 11 and the back cover 13 closing the rear opening of the lamp housing 11. The lamp unit 20 is accommodated in the lamp chamber R.

The lamp unit 20 of the present embodiment mainly includes a light source 21, a reflector 22, a projection lens 23, a motor 24, and a control unit 25. Meanwhile, the lamp unit 20 is fixed to the housing 10 by a configuration not shown.

The light source 21 of the present embodiment has a plurality of light emitting elements 31 mounted on a circuit board 32. The plurality of light emitting elements 31 are arranged in an array form. Electric power is supplied to each of the light emitting elements 31 via the circuit board 32. Such a light source 21 can adjust the intensity of light emitted from each of the light emitting elements 31 by adjusting the electric power supplied to each of the light emitting elements 31. Meanwhile, the number of the light emitting elements 31 is not particularly limited as long as the light source 21 can irradiate light to the reflector 22. For example, the light source 21 may have one light emitting element 31. As such a light emitting element, for example, a light emitting diode (LED) or the like is used.

The reflector 22 of the present embodiment is fixed to an output shaft 51 of the motor 24. The reflector 22 reflects at least a part of light emitted from the light source 21 toward the projection lens 23 while rotating about a rotation axis 24A of the motor 24 passing through the center of the output shaft 51. The configuration of the reflector 22 will be described later.

The projection lens 23 of the present embodiment is an aspheric piano-convex lens. In the projection lens 23, an incident surface 35, which is a surface on the side where the light reflected by the reflector 22 is incident, has a planar shape. And, an exit surface 36, which is a surface on the side where the incident light is emitted, has a convex shape bulging in the emission direction. The light emitted from the projection lens 23 is emitted from the vehicle headlamp 1 via the front cover 12.

The control unit 25 of the present embodiment is connected to the circuit board 32 of the light source 21 and a substrate 85 (to be described later) of the motor 24. The control unit 25 controls the emission state of light of the light source 21 and the rotation state of the output shaft 51 of the motor 24. The control unit 25 performs this control based on a signal input from a control device 26 of a vehicle to the control unit 25 and a signal input from a detection circuit on the substrate 85 (to be described later) of the motor 24 to the control unit 25.

Subsequently, the reflector 22 will be described in detail.

Figure 2:
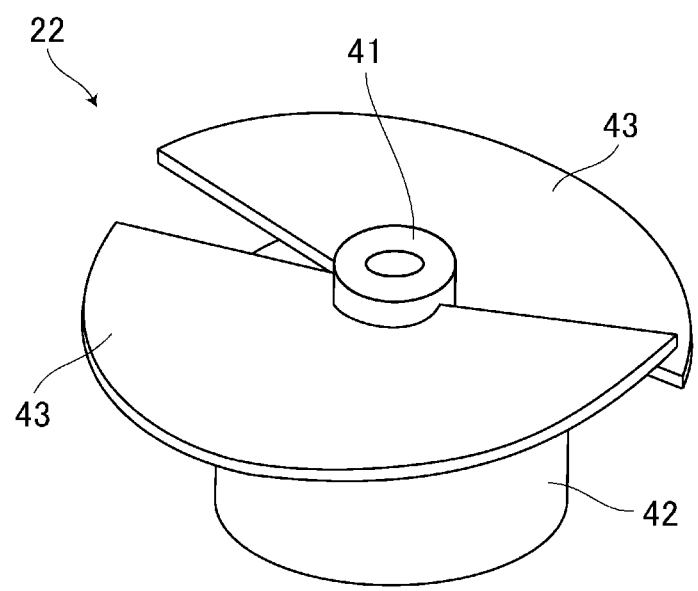
FIG. 2 is a perspective view schematically showing a reflector in FIG. 1.
Figure 3:
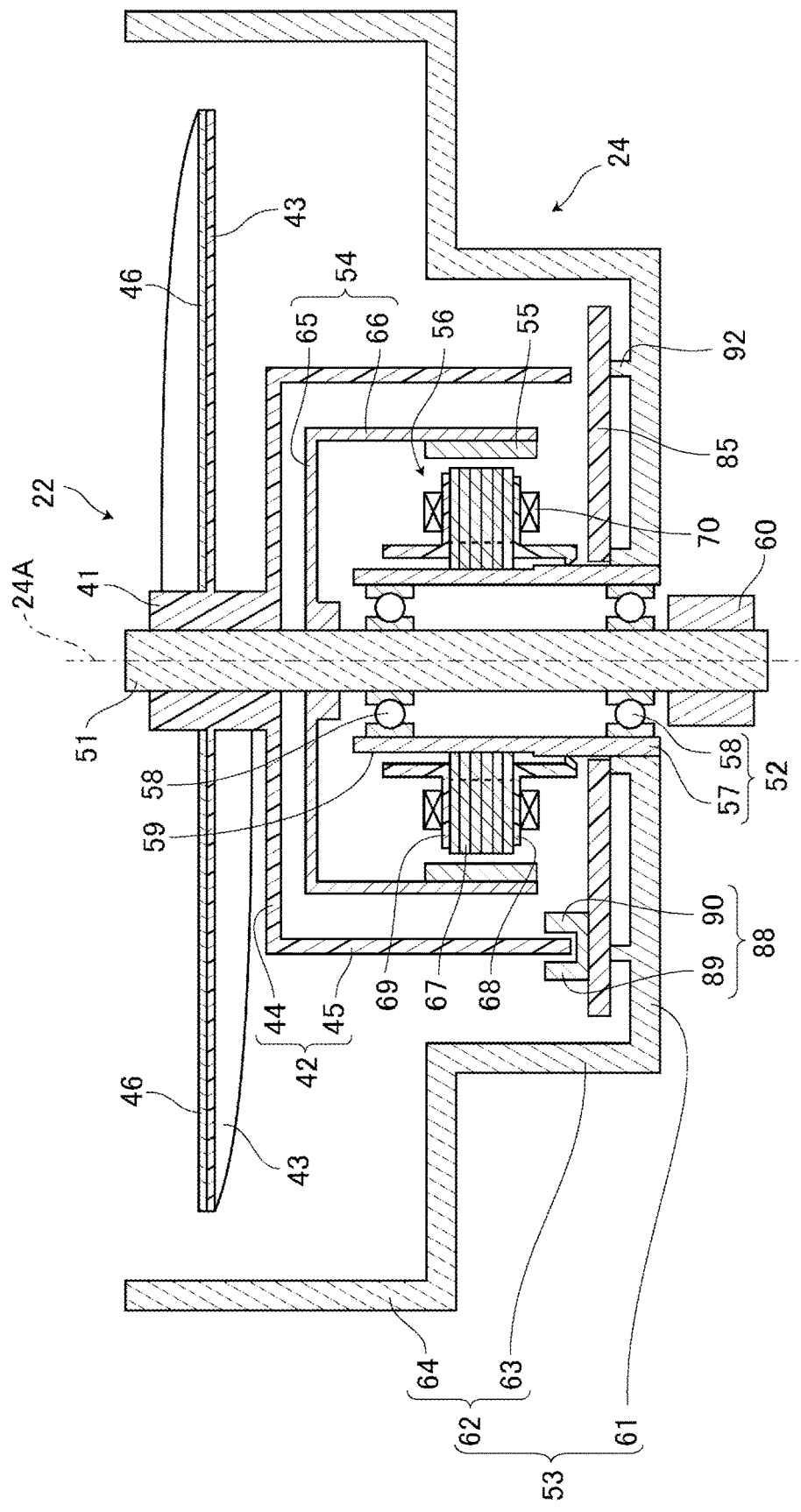
FIG. 3 is a sectional view schematically showing a motor and the reflector in FIG. 1.

FIG. 2 is a perspective view of the reflector 22 in FIG. 1, and FIG. 3 is a sectional view showing the reflector 22 and the motor 24 in FIG. 1. Meanwhile, FIG. 3 is a sectional view parallel to the rotation axis 24A of the motor 24. As shown in FIGS. 2 and 3, the reflector 22 of the present embodiment mainly includes a boss 41, a skirt 42, and two reflecting blades 43. The boss 41, the skirt 42, and the two plate-like reflecting blades 43 are integrally formed by integral molding to constitute the reflector 22.

The boss 41 of the present embodiment is a cylindrical member. The output shaft 51 of the motor 24 is inserted into the boss 41. The boss 41 is fixed to the output shaft 51 by spline fitting or the like.

The skirt 42 of the present embodiment has a top wall 44 and a cylindrical wall 45. In the present embodiment, the top wall 44 is a plate-like member extending in a radial direction of the boss 41 from the entire circumference of an outer peripheral surface at one end portion of the boss 41 and having a substantially circular shape centered on a cylindrical axis of the boss 41. Further, the cylindrical wall 45 is a cylindrical member whose one end is connected along an outer peripheral edge of the top wall 44. The cylindrical wall 45 extends to the side opposite to the side where the boss 41 is located in a cylindrical axis direction of the boss 41, and a cylindrical axis of the cylindrical wall 45 substantially coincides with the cylindrical axis of the boss 41. A plurality of notches (not shown) is formed in such a cylindrical wall 45 from the end opposite to the boss 41 to a predetermined position along the cylindrical axis direction of the cylindrical wall 45.

Each of the two reflecting blades 43 of the present embodiment has substantially the same configuration. The reflecting blade 43 of the present embodiment is a substantially semicircular plate-like member. The center portion of the chord of the semicircular reflecting blade 43, i.e., the center portion of the semicircle is fixed to an outer peripheral surface of the boss 41 at a predetermined distance from the skirt 42. The two reflecting blades 43 respectively extend from the outer peripheral surface of the boss 41 in the radial direction of the boss 41 and do not overlap with each other as viewed from the cylindrical axis direction of the boss 41. The two reflecting blades 43 are arranged in rotational symmetry with respect to the cylindrical axis of the boss 41. A reflective film 46 is provided on the surface of each reflecting blade 43 on the side opposite to the skirt 42 by metal vapor deposition or the like. The light emitted from the light source 21 is reflected by the reflective films 46. By the way, the reflector 22 is arranged so that most of light emitted from the light source 21 is irradiated to a position shifted in the radial direction of the boss 41 from the cylindrical axis of the boss 41 on the side of the reflector 22 where the reflecting blades 43 are positioned. Therefore, when the light emitted from the light source 21 is continuously irradiated to the reflector 22 in a state where the reflector 22 is rotated by the motor 24, the irradiation position of the light moves in a circumferential direction of the reflecting blade 43 on the reflective film 46 of one of the reflecting blades 43, and then, moves in the circumferential direction of the reflecting blade 43 on the reflective film 46 of the other of the reflecting blades 43. Further, the light irradiated to the reflector 22 in this manner is alternately reflected by the reflective films 46 of the two reflecting blades 43.

Each of the reflecting blades 43 is curved such that the inclination of the surface on which the reflective film 46 is provided with respect to the plane perpendicular to the cylindrical axis of the boss 41 is continuously changed along the circumferential direction centered on the cylindrical axis of the boss 41. Specifically, the reflecting blade 43 is curved such that the region irradiated with the light emitted from the light source 21, reflected by the reflective film 46 and transmitted through the projection lens 23 moves in a predetermined direction in accordance with the rotation of the reflector 22 by the motor 24. Meanwhile, in FIG. 1, the arrow D indicating the movement direction of the region irradiated with the light is indicated by a solid line.

Subsequently, the motor 24 will be described in detail.

Figure 4:
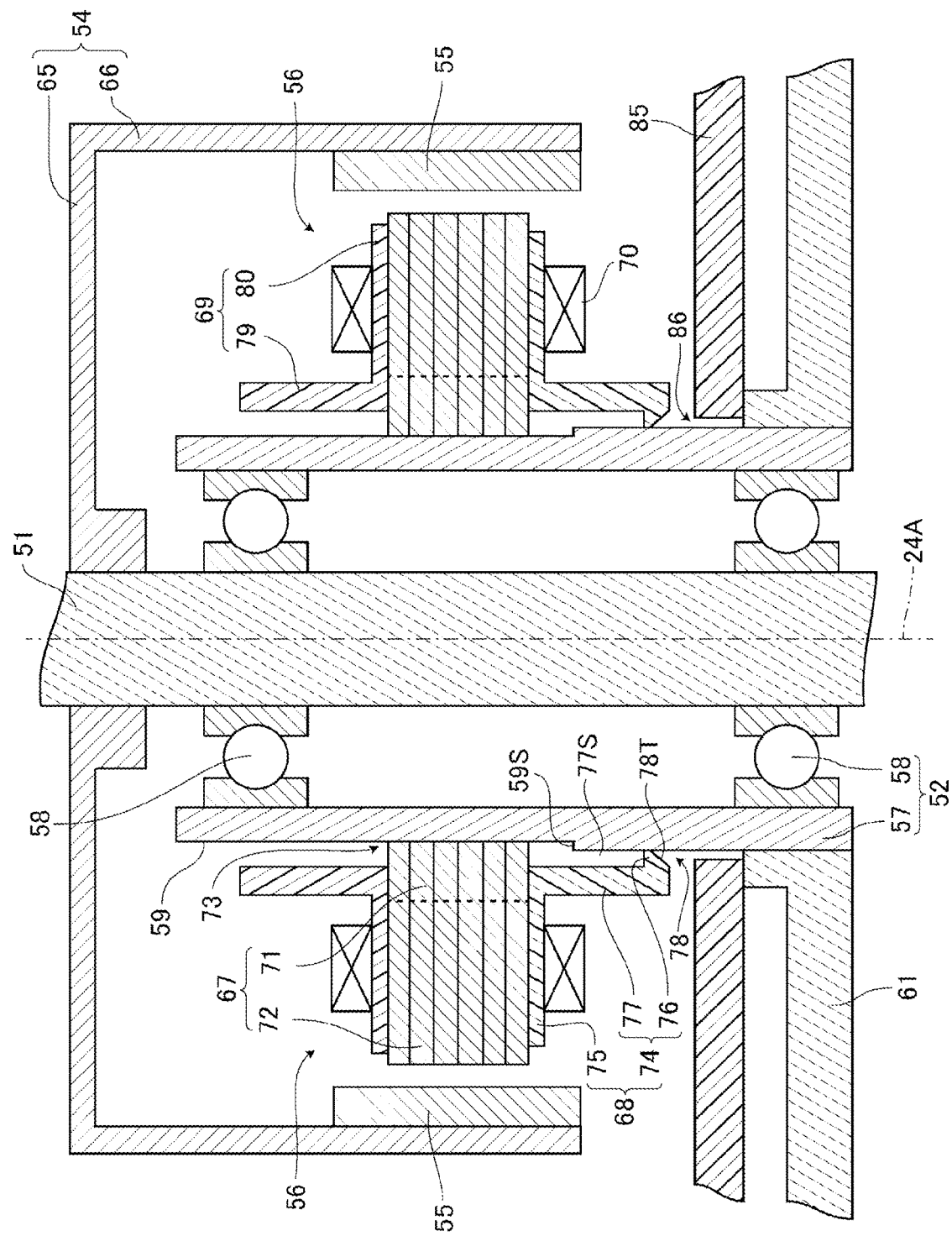
FIG. 4 is a partial enlarged view of FIG. 3.

FIG. 4 is a partial enlarged view of FIG. 3. In FIG. 4, the motor 24 is shown in an enlarged state. As shown in FIGS. 3 and 4, the motor 24 of the present embodiment is an outer rotor type brushless motor and mainly includes the output shaft 51, a bearing part 52, an outer case 53, an inner case 54, a plurality of permanent magnets 55, a magnet unit 56, and the substrate 85.

The output shaft 51 and the bearing part 52 of the present embodiment are shaft members extending in the direction of the rotation axis 24A of the motor 24. The output shaft 51 is a metallic cylindrical member, and the bearing part 52 includes a holder 57 and a pair of radial ball bearings 58. The holder 57 is a metallic cylindrical member and has a press-fit portion 59 whose outer peripheral surface is scraped from one end side to a predetermined position along the extending direction of the holder 57. Therefore, a step 59S serving as a boundary between the press-fit portion 59 and the portion other than the press-fit portion 59 is formed on the outer peripheral surface of the holder 57. In the present embodiment, the dimensional accuracy on the outer peripheral surface of the press-fit portion 59, for example, the dimension accuracy such as roundness is higher than the dimensional accuracy on the outer peripheral surface other than the press-fit portion 59. The pair of radial ball bearings 58 are disposed in an internal space of the holder 57 at a predetermine interval in a cylindrical axis direction of the holder 57. The radial ball bearings 58 are fixed to the holder 57. The output shaft 51 is inserted into the internal space of the holder 57 and is supported so as to be rotatable with respect to the holder 57 by the pair of radial ball bearings 58 in the internal space of the holder 57. That is, the bearing part 52 rotatably supports the output shaft 51. The outer peripheral surface of the bearing part 52 is an outer peripheral surface of the holder 57 made of metal. One end portion of the output shaft 51 rotatably supported by the bearing part 52 in this manner protrudes from an end of the holder 57 on the side of the press-fit portion 59, and the reflector 22 is fixed to the one end portion as described above. Further, the other end portion of the output shaft 51 protrudes from an end of the holder 57 on the side opposite to the press-fit portion 59, and a weight 60 is fixed to the other end portion. For example, the mass of the weight 60 is set such that the center of gravity of the output shaft 51 to which the reflector 22 and the weight 60 are fixed is positioned between the pair of radial ball bearings 58 in the axial direction of the output shaft 51. With this configuration, the rotational vibration of the output shaft 51 on the holder 57 can be suppressed. As the metal forming the output shaft 51, for example, chromium molybdenum steel or the like can be used. As the metal forming the holder 57, for example, brass or the like can be used.

The outer case 53 of the present embodiment has a bottom wall 61 and a cylindrical wall 62. In the present embodiment, the bottom wall 61 is a plate-like member formed in a substantially circular shape. A through-hole penetrating in a plate thickness direction is formed substantially at the center of the bottom wall 61. An end portion of the holder 57 on the side where the weight 60 is positioned is inserted into the through-hole of the bottom wall 61, so that the bottom wall 61 is fixed to the end portion of the holder 57. Further, the cylindrical wall 62 is a cylindrical member which has one end connected along an outer peripheral edge of the bottom wall 61. The cylindrical wall 62 extends to the side where the reflector 22 is positioned in the axial direction of the output shaft 51. The cylindrical axis of the cylindrical wall 62 substantially coincides with the axis of the output shaft 51. In order from the end opposite to the end to which the bottom wall 61 is connected, the cylindrical wall 62 has a large-diameter portion 64 whose inner diameter is larger than the maximum width of the reflector 22 in the radial direction of the output shaft 51, and a small-diameter portion 63 which is connected to the large-diameter portion 64 and whose inner diameter is smaller than the inner diameter of the large-diameter portion 64. The reflector 22 is positioned in an internal space of the large-diameter portion 64, and the periphery of the reflector 22 in the radial direction of the output shaft 51 is covered with the large-diameter portion 64. As the material forming the outer case 53, for example, metals such as aluminum and stainless steel or resins or the like can be used.

The inner case 54 of the present embodiment has a top wall 65 and a cylindrical wall 66. In the present embodiment, the top wall 65 is a plate-like member formed in a substantially circular shape. A through-hole penetrating in a plate thickness direction is formed substantially at the center of the top wall 65. The output shaft 51 is inserted into the through-hole of the top wall 65, so that the top wall 65 is fixed to the output shaft 51. The top wall 65 fixed to the output shaft 51 in this manner is positioned between the boss 41 of the reflector 22 and the end of the holder 57 on the side of the press-fit portion 59 in the axial direction of the output shaft 51. The cylindrical wall 66 is a cylindrical member which has one end connected along an outer peripheral edge of the top wall 65. The cylindrical wall 66 extends to the side where the weight 60 is positioned in the axial direction of the output shaft 51. The cylindrical axis of the cylindrical wall 66 substantially coincides with the axis of the output shaft 51. The plurality of permanent magnets 55 are fixed to an inner peripheral surface of the cylindrical wall 66 at substantially equal intervals on the entire circumference of the inner peripheral surface. The permanent magnets 55 are arranged such that the magnetic poles of the permanent magnets 55 adjacent to each other in the circumferential direction of the cylindrical wall 66 have different positive and negative polarities on the surfaces of the permanent magnets 55 opposite to the inner peripheral surface of the cylindrical wall 66. In the present embodiment, four permanent magnets 55 are fixed to the inner peripheral surface of the cylindrical wall 66. As the material forming the inner case 54, for example, metals such as aluminum and stainless steel or resins or the like can be used.

The magnet unit 56 of the present embodiment includes a core 67, a first insulator 68, a second insulator 69, and a plurality of windings 70. The magnet unit 56 is fixed to the holder 57 of the bearing part 52 in a space between the bottom wall 61 of the outer case 53 and the top wall 65 of the inner case 54. The core 67 of the present embodiment is configured by stacking a plurality of metallic plate-like members in a plate thickness direction. The core 67 has a cylindrical portion 71 and a plurality of protrusions 72. In the present embodiment, the cylindrical portion 71 is formed in a cylindrical shape, and a press-fit hole 73 defined by an inner peripheral surface of the cylindrical portion 71 penetrates through the plurality of metallic plate-like members in the plate thickness direction. Further, each of the plurality of protrusions 72 has substantially the same structure and protrudes from an outer peripheral surface of the cylindrical portion 71 by a predetermined length in a radial direction of the cylindrical portion 71. The plurality of protrusions 72 is arranged at substantially equal intervals on the entire circumference of the outer peripheral surface of the cylindrical portion 71. The outer shape of the protrusion 72 as viewed from the cylindrical axis direction of the cylindrical portion 71 has a substantially T shape in which the width in the circumferential direction of the cylindrical portion 71 at the leading end is wider than the other portions. In the present embodiment, four protrusions 72 protrude from the cylindrical portion 71. As the metal forming the plate-like member constituting the core 67, for example, iron, cobalt, nickel or the like can be used.

The first insulator 68 of the present embodiment is formed of an insulating material and has a protective member 74 and a covering portion 75. The protective member 74 and the covering portion 75 are integrated with each other by integral molding. That is, in the present embodiment, the protective member 74 is a part of the first insulator 68. The protective member 74 of the present embodiment has a contact portion 76 and a collecting portion 77. In the present embodiment, the contact portion 76 is a plate-like member having a substantially circular shape. A through-hole 78 penetrating in a plate thickness direction is formed substantially at the center of the contact portion 76. The contact portion 76 is disposed at a predetermined distance from one end face in the cylindrical axis direction of the cylindrical portion 71 of the core 67 such that the cylindrical axis and the center of the through-hole 78 substantially coincide. The minimum diameter of the through-hole 78 is slightly smaller than the outer diameter of the press-fit portion 59 of the holder 57 of the bearing part 52. Further, the diameter of the through-hole 78 at the end opposite to the core 67 is larger than the outer diameter of the holder 57 between the press-fit portion 59 and the portion to which the bottom wall 61 of the outer case 53 is fixed. Further, the contact portion 76 has a tapered portion 78T in which the diameter of the through-hole 78 is reduced from the end opposite to the core 67 toward the core 67. Meanwhile, the contact portion 76 may not have such a tapered portion 78T.

The collecting portion 77 of the present embodiment is a cylindrical member which has one end connected along an outer peripheral edge of the contact portion 76 and extends from the contact portion 76 toward the core 67. That is, the opening of the collecting portion 77 on the side opposite to the core 67 is closed by the contact portion 76 except for the portion corresponding to the through-hole 78 of the contact portion 76. The inner diameter of the collecting portion 77 is larger than the outer diameter of the holder 57 of the bearing part 52 between the press-fit portion 59 and the portion to which the bottom wall 61 of the outer case 53 is fixed, and is smaller than the outer diameter of the cylindrical portion 71 of the core 67. The entire circumference of the collecting portion 77 at the end on the side of the core 67 is in contact with the end face of the cylindrical portion 71 of the core 67. Therefore, the opening at the end of the collecting portion 77 on the side of the core 67 is closed by the core 67 except for the portion corresponding to the press-fit hole 73 of the core 67. An internal space of the collecting portion 77 communicates with the press-fit hole 73.

The covering portion 75 of the present embodiment is a plate-like member which extends from the entire circumference of the outer peripheral surface of the collecting portion 77 at the end opposite to the contact portion 76 along the end face of the core 67 in the radial direction of the collecting portion 77. In the present embodiment, the outer shape of the covering portion 75 as viewed from an axial direction of the collecting portion 77 substantially coincides with the outer shape of the core 67 as viewed from the same direction. A part of one end face of the protrusion 72 of the core 67 is covered with the covering portion 75. The first insulator 68 as described above is attached to one end face of the core 67 which is partially covered with the covering portion 75.

The second insulator 69 of the present embodiment is formed of an insulating material and has a cylindrical wall portion 79 and a covering portion 80. The cylindrical wall portion 79 and the covering portion 80 are integrated with each other by integral molding. In the present embodiment, the cylindrical wall portion 79 is a cylindrical member which extends from an end face of the cylindrical portion 71 of the core 67 on the side opposite to the first insulator 68 by a predetermined length in the cylindrical axis direction of the cylindrical portion 71. The cylindrical axis of the cylindrical wall portion 79 substantially coincides with the cylindrical axis of the cylindrical portion 71 of the core 67. The entire circumference of the end face of the cylindrical wall portion 79 on the side of the core 67 is in contact with the end face of the cylindrical portion 71 of the core 67, and the inner diameter of the cylindrical wall portion 79 is larger than the outer diameter of the press-fit portion 59 of the holder 57 of the bearing part 52. The covering portion 80 of the present embodiment is a plate-like member which extends from the entire circumference of the outer peripheral surface of the cylindrical wall portion 79 at the end portion on the side of the core 67 along the end face of the core 67 in the radial direction of the cylindrical wall portion 79. In the present embodiment, the outer shape of the covering portion 80 as viewed from an axial direction of the cylindrical wall portion 79 substantially coincides with the outer shape of the core 67 as viewed from the same direction. A part of the other end face of the protrusion 72 of the core 67 is covered with the covering portion 80. The second insulator 69 as described above is attached to the other end face of the core 67 which is partially covered with the covering portion 80. As the insulating material forming the first insulator 68 and the second insulator 69, for example, resin such as nylon can be used.

The windings 70 of the present embodiment are respectively wound around the protrusions 72 of the core 67 to which the first insulator 68 and the second insulator 69 are attached, and the windings 70 are insulated from the core 67 by the first insulator 68 and the second insulator 69. As these windings 70, for example, a copper wire or the like can be used.

In the magnet unit 56 as described above, when current is applied to each of the windings 70 wound around the protrusions 72 of the core 67, a magnetic field is formed in each of the protrusions 72 and penetrates in the extending direction of the protrusions 72. That is, the magnet unit 56 has a plurality of electromagnets at substantially equal intervals in the circumferential direction centered on the press-fit hole 73 of the cylindrical portion 71 of the core 67. The magnet unit 56 has a structure in which the electromagnets are integrated. In the motor 24 of the present embodiment, the direction of the magnetic pole in the magnetic field generated by the windings 70 is changed over time by controlling the direction of current applied to each of the windings 70 in the magnet unit 56. Further, a magnetic force generated between the magnetic field and the permanent magnets 55 fixed to the inner case 54 is used to apply a force in the circumferential direction of the inner case 54 to the inner case 54 to which the permanent magnets 55 are fixed. In this way, the inner case 54 and the output shaft 51 to which the inner case 54 is fixed are integrally rotated with respect to the bearing part 52. As the output shaft 51 is rotated in this manner, the reflector 22 fixed to the output shaft 51 is rotated.

By the way, the magnet unit 56 of the present embodiment is fixed to the holder 57 by press-fitting the press-fit portion 59 of the holder 57 of the bearing part 52 into the press-fit hole 73 of the core 67. At this time, the holder 57 of the bearing part 52 is also inserted into the through-hole 78 and an internal space of the collecting portion 77 in the first insulator 68, and an internal space of the cylindrical wall portion 79 in the second insulator 69. Further, in a state where the magnet unit 56 is fixed to the holder 57, the contact portion 76 of the protective member 74 of the first insulator 68 is positioned between the press-fit portion 59 of the holder 57 and the portion to which the bottom wall 61 of the outer case 53 is fixed. At this time, the portion of the inner peripheral surface defining the through-hole 78 formed in the contact portion 76 and having the smallest diameter is in contact with the entire circumference of the outer peripheral surface of the holder 57 between the press-fit portion 59 and the portion to which the bottom wall 61 of the outer case 53 is fixed. Further, the collecting portion 77 is positioned closer to the core 67 than the contact portion 76 and surrounds the holder 57 while spaced from the outer peripheral surface of the holder 57. An opening is formed at an end of the collecting portion 77 on the side of the core 67. Therefore, a space 77S is formed between the collecting portion 77 and the holder 57. By the way, the entire circumference of the collecting portion 77 at the end on the side of the core 67 is in contact with the end face of the core 67 on the side of the protective member 74 and the end face of the cylindrical portion 71, and the press-fit portion 59 of the holder 57 is press-fitted into the press-fit hole 73 of the core 67. Therefore, the space 77S is a closed space surrounded by the holder 57, the core 67, and the protective member 74. Meanwhile, the entire circumference of the collecting portion 77 at the end on the side of the core 67 may not be in contact with the end face of the core 67 on the side of the protective member 74, and the space 77S may not be a closed space.

The substrate 85 of the present embodiment has a feeding circuit (not shown) to which electric power is supplied, and a detection circuit (not shown). A through-hole 86 into which the holder 57 of the bearing part 52 is inserted is formed in the substrate 85. The control unit 25 is connected to the feeding circuit and the detection circuit, respectively. The substrate 85 is fixed on a rib 92 protruding from the bottom wall 61 of the outer case 53 on the side of the magnet unit 56. The substrate 85 fixed in this manner is positioned at a predetermined distance from the core 67 in the extending direction of the output shaft 51, and the protective member 74 of the first insulator 68 is disposed between the core 67 and the substrate 85 in the extending direction of the output shaft 51. Further, the substrate 85 overlaps with the core 67 of the magnet unit 56 as viewed from the extending direction of the output shaft 51.

The plurality of windings 70 of the magnet unit 56 are electrically connected to the feeding circuit of the substrate 85, respectively. Current is applied to each of the windings 70 via this feeding circuit. This feeding circuit applies current to each of the windings 70 so that the inner case 54 and the output shaft 51 are integrally rotated as described above, based on the signal input to the feeding circuit from the control unit 25 described above.

In the present embodiment, a photo-interrupter 88 which is a transmission type optical encoder is mounted on the detection circuit of the substrate 85. The photo-interrupter 88 has a light emitting portion 89 and a light receiving portion 90 corresponding to each other. The photo-interrupter 88 is disposed so that an end portion of the cylindrical wall 45 of the skirt 42 of the reflector 22, in which a slit (not shown) is formed, is positioned between the light emitting portion 89 and the light receiving portion 90. The photo-interrupter 88 can detect that the slit formed in the cylindrical wall 45 passes between the light emitting portion 89 and the light receiving portion 90 when the reflector 22 is rotated. The detection circuit is configured to be able to detect the rotation position of the reflector 22 based on the signal from the photo-interrupter 88 and outputs a signal relating to the rotation position of the reflector 22 to the control unit 25. Meanwhile, the number of the photo-interrupters 88 mounted on the detection circuit is not particularly limited. However, from the viewpoint of improving the detection accuracy of the rotation position of the reflector 22, it is preferable that a plurality of photo-interrupters 88 is mounted on the detection circuit. Further, the detection circuit may detect the rotation position of the reflector 22. For example, the detection circuit may be configured to be able to detect the rotation position of the reflector 22 by using a photo-reflector which is a reflection type optical encoder. Further, the substrate 85 may be configured by a substrate on which a feeding circuit is formed and another substrate on which a detection circuit is formed.

Next, the assembly of the motor 24 will be described.

In the motor 24 of the present embodiment, for example, first, the outer case 53 is attached to the holder 57 of the bearing part 52. Subsequently, the substrate 85 is fixed on the rib 92 protruding from the bottom wall 61 of the outer case 53. Subsequently, as described above, the press-fit portion 59 of the holder 57 of the bearing part 52 is press-fitted into the press-fit hole 73 of the core 67 of the magnet unit 56, so that the magnet unit 56 is fixed to the holder 57. At this time, the magnet unit 56 is fixed to the holder 57 so that the first insulator 68 is positioned on the side of the substrate 85. Subsequently, the output shaft 51 to which the inner case 54 is fixed is inserted into the holder 57 of the bearing part 52, the output shaft 51 is supported by the bearing part 52, and the motor 24 is assembled. The weight 60 and the reflector 22 are fixed to the output shaft 51 of the motor 24 assembled in this manner. Meanwhile, the assembly order of the motor 24 is not particularly limited. For example, after the output shaft 51 is supported by the bearing part 52, the inner case 54 may be fixed to the output shaft 51.

Next, the emission of light by the vehicle headlamp 1 will be described.

For example, the control unit 25 detects a signal indicating the irradiation of light from the control device 26 of the vehicle. In an input state where the signal indicating the irradiation of light is input to the control unit 25, the control unit 25 controls the light emission state of the light source 21 and the rotation state of the output shaft 51 of the motor 24 to emit light from the vehicle headlamp 1. Specifically, the control unit 25 causes light to emit from the light source 21 and rotates the output shaft 51 of the motor 24 to rotate the reflector 22. Light emitted from the light source 21 is reflected by the reflective films 46 provided on the reflecting blades 43 of the reflector 22, transmitted through the projection lens 23, and then, emitted from the vehicle headlamp 1 via the front cover 12.

Since the reflector 22 is rotated by the motor 24, the light emitted from the light source 21 as described above is alternately reflected by the reflective films 46 of the two reflecting blades 43. Further, the reflecting blades 43 are curved so that the region irradiated with the light emitted from the light source 21 as described above and reflected by the reflective films 46 and transmitted through the projection lens 23 moves in a predetermined direction according to the rotation of the reflector 22 by the motor 24. Therefore, in a state where light is emitted from the light source 21 and the reflector 22 is rotated by the motor 24, the region irradiated with the light emitted from the vehicle headlamp 1 repeatedly moves from a predetermined position to another predetermined position.

By the way, when light is repeatedly irradiated in a period shorter than a temporal resolution of human vision, a person can recognize that light continues to be irradiated by the afterimage phenomenon. In the present embodiment, when the time taken for the region irradiated with the light emitted from the vehicle headlamp 1 to move from a predetermined position to another predetermined position, that is, the time taken for the reflector 22 to rotate approximately a half turn is shorter than a temporal resolution of human vision, light can be irradiated to the entire range in which the region irradiated with the light is moved by the afterimage phenomenon. In this way, the vehicle headlamp 1 can emit light of a light distribution pattern having a predetermined outer shape by the afterimage phenomenon.

Meanwhile, from the viewpoint of suppressing the flickering perception of the light irradiated by the afterimage phenomenon, it is preferable that the time taken for the region irradiated with the light emitted from the vehicle headlamp 1 to move from a predetermined position to another predetermined position is $\frac{1}{15}$ sec or less. The temporal resolution of human vision is approximately $\frac{1}{30}$ sec. When the time is twice $\frac{1}{30}$ sec, the flickering perception of light can be suppressed. When the time is $\frac{1}{30}$ sec or less, the time almost exceeds the temporal resolution of human vision. Therefore, the flickering perception of light can be further suppressed. Further, when the time is $\frac{1}{60}$ sec or less, this time is desirable from the viewpoint of further suppressing the flickering perception of light.

By the way, the intensity distribution or the outer shape of the light distribution pattern of light irradiated by such afterimage phenomenon can be changed by adjusting the intensity of the light according to the movement of the region irradiated with the light. That is, while the irradiation position of the light emitted from the light source 21 moves from one end to the other end in the circumferential direction of the reflecting blade 43 as the reflector 22 is rotated by the motor 24, the intensity distribution or the outer shape of the light distribution pattern of light irradiated by the afterimage phenomenon can be changed by adjusting the intensity of light emitted from the light source 21. In other words, the intensity distribution or the outer shape of the light distribution pattern of light irradiated by the afterimage phenomenon can be changed by adjusting the intensity of light emitted from the light source 21 according to the rotation of the reflector 22. For example, when the intensity of the light emitted from the light source 21 is weakened or the emission of the light from the light source 21 is stopped while the irradiation position of the light emitted from the light source 21 moves from a predetermined position to another predetermined position in the circumferential direction of the reflecting blade 43, the outer shape of the light distribution pattern can be reduced or the intensity of light can be weakened in a predetermined range of the region irradiated by the afterimage phenomenon.

In the present embodiment, the control unit 25 can adjust the intensity of the light emitted from the light source 21 according to the rotation of the reflector 22 by controlling the rotation state of the output shaft 51 of the motor 24 based on the signal input to the control unit 25 from the detection circuit of the substrate 85 of the motor 24. As described above, the detection circuit of the substrate 85 can detect the rotation position of the reflector 22. The position at which the light emitted from the light source 21 is incident on the reflector 22 is hardly changed even when the reflector 22 is rotated. Therefore, the control unit 25 can detect at which position in the circumferential direction of the reflecting blade 43 of the reflector 22 the light emitted from the light source 21 is incident, based on the signal input to the control unit 25 from the detection circuit of the substrate 85. In this way, by controlling the rotation state of the output shaft 51 of the motor 24 by such a control unit 25, the vehicle headlamp 1 of the present embodiment can adjust the intensity of light emitted from the light source 21 according to the rotation of the reflector 22 and can change the outer shape of the light distribution pattern or change the intensity of light in a predetermined range of the region irradiated by the afterimage phenomenon.

By the way, in the present embodiment, the rotation position of the reflector 22 is directly detected by using the photo-interrupter 88. Therefore, the vehicle headlamp 1 of the present embodiment can improve the detection accuracy of the rotation position of the reflector 22 and can easily change the outer shape of the light distribution pattern or change the intensity of light in a predetermined range of the region irradiated by the afterimage phenomenon, as compared to the case where the rotation position of the reflector 22 is indirectly detected on the basis of the rotation position of the inner case 54 of the motor 24 rotating integrally with the reflector 22, for example.

As described above, the motor 24 in the vehicle headlamp 1 of the present embodiment includes the output shaft 51 and the bearing part 52 which are shaft members extending in the direction of the rotation axis 24A of the motor 24, the magnet unit 56, the substrate 85, and the first insulator 68 having the protective member 74. The bearing part 52 rotatably supports the output shaft 51, and the holder 57 of the bearing part 52 is made of metal. The core 67 of the magnet unit 56 is made of metal, and the press-fit hole 73 into which the holder 57 of the bearing part 52 is press-fitted is formed in the core 67. The substrate 85 is disposed at a predetermined distance from the core 67 in the extending direction of the output shaft 51, and electric power is supplied to the feeding circuit and the detection circuit of the substrate 85. The protective member 74 of the first insulator 68 has the contact portion 76 in which the through-hole 78 is formed. The holder 57 is inserted into the through-hole 78. The protective member 74 is disposed between the core 67 and the substrate 85 in the extending direction of the output shaft 51. The contact portion 76 of the protective member 74 is in contact with the outer peripheral surface of the holder 57 of the bearing part 52 over the entire circumference.

In the motor 24 in the vehicle headlamp 1 of the present embodiment, as described above, the protective member 74 is disposed between the core 67 of the magnet unit 56 and the substrate 85 in the extending direction of the output shaft 51, and the contact portion 76 of the protective member 74 is in contact with the outer peripheral surface of the holder 57 over the entire circumference. Therefore, shavings generated when the holder 57 is press-fitted into the press-fit hole 73 of the core 67 and the outer peripheral surface of the holder 57 and the inner peripheral surface defining the press-fit hole 73 of the core 67 are scraped are received by the protective member 74, so that it is possible to prevent the shavings from contacting a conducting wire or the like of the substrate 85. In this way, the occurrence of a short circuit on the substrate 85 caused by the shavings can be suppressed. For example, it is possible to suppress malfunction such as that the output shaft 51 of the motor 24 does not rotate.

In the present embodiment, as described above, the minimum diameter of the through-hole 78 is slightly smaller than the outer diameter of the press-fit portion 59 of the holder 57. Therefore, the protective member 74 is elastically deformed so that the diameter of the through-hole 78 is widened, and the contact portion 76 of the protective member 74 is brought into close contact with the outer peripheral surface of the holder 57 by the elastic force of the protective member 74. In this way, even when the protective member 74 is deformed due to heat or aged deterioration or the like, the formation of a gap between the contact portion 76 of the protective member 74 and the outer peripheral surface of the holder 57 can be suppressed by the deformation of the protective member 74, and the occurrence of a short circuit on the substrate 85 caused by the shavings can be suppressed.

By the way, since the holder 57 has the press-fit portion 59 whose outer peripheral surface is scraped in order to increase the dimensional accuracy on the outer peripheral surface as described above, the step 59S serving as a boundary between the press-fit portion 59 and the portion other than the press-fit portion 59 is formed on the outer peripheral surface of the holder 57. Generally, when a member having such a step is inserted into a through-hole of another member, the step tends to make it difficult to insert the member into the through-hole. However, in the present embodiment, the diameter of the through-hole 78 at the end opposite to the core 67 is larger than the outer diameter of the portion between the press-fit portion 59 of the holder 57 and the portion to which the bottom wall 61 of the outer case 53 is fixed. Further, the contact portion 76 has the tapered portion 78T in which the diameter of the through-hole 78 is reduced from the end opposite to the core 67 toward the core 67. Therefore, as compared to the case where the protective member 74 does not have the tapered portion 78T, when the holder 57 in which the step 59S is formed is inserted into the through-hole 78 of the contact portion 76 of the protective member 74, it is difficult for the protective member 74 to catch on the step 59S and the holder 57 can be easily inserted into the through-hole 78 of the contact portion 76 of the protective member 74. As a result, the productivity of the motor can be improved.

In the present embodiment, the protective member 74 has the collecting portion 77. The collecting portion 77 surrounds the holder 57 while spaced from the outer peripheral surface of the holder 57 on the side of the core 67 from the contact portion 76 with which the outer peripheral surface of the holder 57 is in contact, and an opening is formed at the end of the collecting portion 77 on the side of the core 67. Therefore, as described above, the space 77S is formed between the collecting portion 77 of the protective member 74 and the holder 57. Further, since the opening is formed at the end of the collecting portion 77 on the side of the core 67, the shavings can be trapped in the space 77S between the collecting portion 77 and the holder 57 via the opening and can be retained in the space 77S. Therefore, even when the output shaft 51 or the like of the motor 24 is rotated and the shavings are rolled up by this rotation, it is possible to prevent the shavings from contacting a conducting wire or the like of the substrate 85. As a result, as compared to the case where the space 77S is not formed, the occurrence of a short circuit on the substrate 85 caused by the shavings can be further suppressed.

In the present embodiment, the entire circumference of the collecting portion 77 at the end on the side of the core 67 is in contact with the end face of the core 67 on the side of the protective member 74 and the end face of the cylindrical portion 71, and the press-fit portion 59 of the holder 57 is press-fitted into the press-fit hole 73 of the core 67. Therefore, the space 77S is a closed space surrounded by the holder 57, the core 67, and the protective member 74. As a result, as compared to the case where the space 77S is not a closed space, the shavings retained in the space 77S can be prevented from leaving the space 77S, so that the occurrence of a short circuit on the substrate 85 caused by the shavings can be further suppressed.

In the present embodiment, the protective member 74 is a part of the first insulator 68 formed of an insulating material and covering a part of the end face of the core 67 on the side of the substrate 85. Therefore, the protective member 74 also serves as a part of the first insulator 68. As a result, as compared to the case where the protective member 74 and the first insulator 68 are formed separately, the number of parts can be reduced and the cost of the motor 24 can be reduced.

In the present embodiment, as described above, the diameter of the through-hole 78 is slightly smaller than the outer diameter of the press-fit portion 59 of the holder 57 of the bearing part 52. Therefore, in an initial state where the press-fit portion 59 of the holder 57 is press-fitted into the press-fit hole 73 of the core 67, the contact portion 76 of the protective member 74 can be maintained in a state of being in contact with the outer peripheral surface of the press-fit portion 59 of the holder 57. In a state where the press-fitting progresses and the through-hole 78 of the protective member 74 is positioned between the press-fit portion 59 of the holder 57 and the portion to which the bottom wall 61 of the outer case 53 is fixed, the contact portion 76 can be maintained in a state of being in contact with the entire circumference of the outer peripheral surface on the side of the bottom wall 61 of the outer case 53 from the press-fit portion 59 of the holder 57. Therefore, while the press-fit portion 59 of the holder 57 is press-fitted into the press-fit hole 73 of the core 67, the contact portion 76 can be maintained in a state of being in contact with the outer peripheral surface of the holder 57 over the entire circumference. As a result, it is possible to further prevent the shavings from contacting a conducting wire or the like of the substrate 85, and the occurrence of a short circuit on the substrate 85 caused by the shavings can be further suppressed.

Second Embodiment

Next, a second embodiment of the disclosure will be described in detail with reference to FIGS. 5 and 6. Meanwhile, unless otherwise specified, the components of the motor of the present embodiment, which are the same as or equivalent to those of the first embodiment, are denoted by the same reference numerals and redundant description thereof will be omitted.

Figure 5:
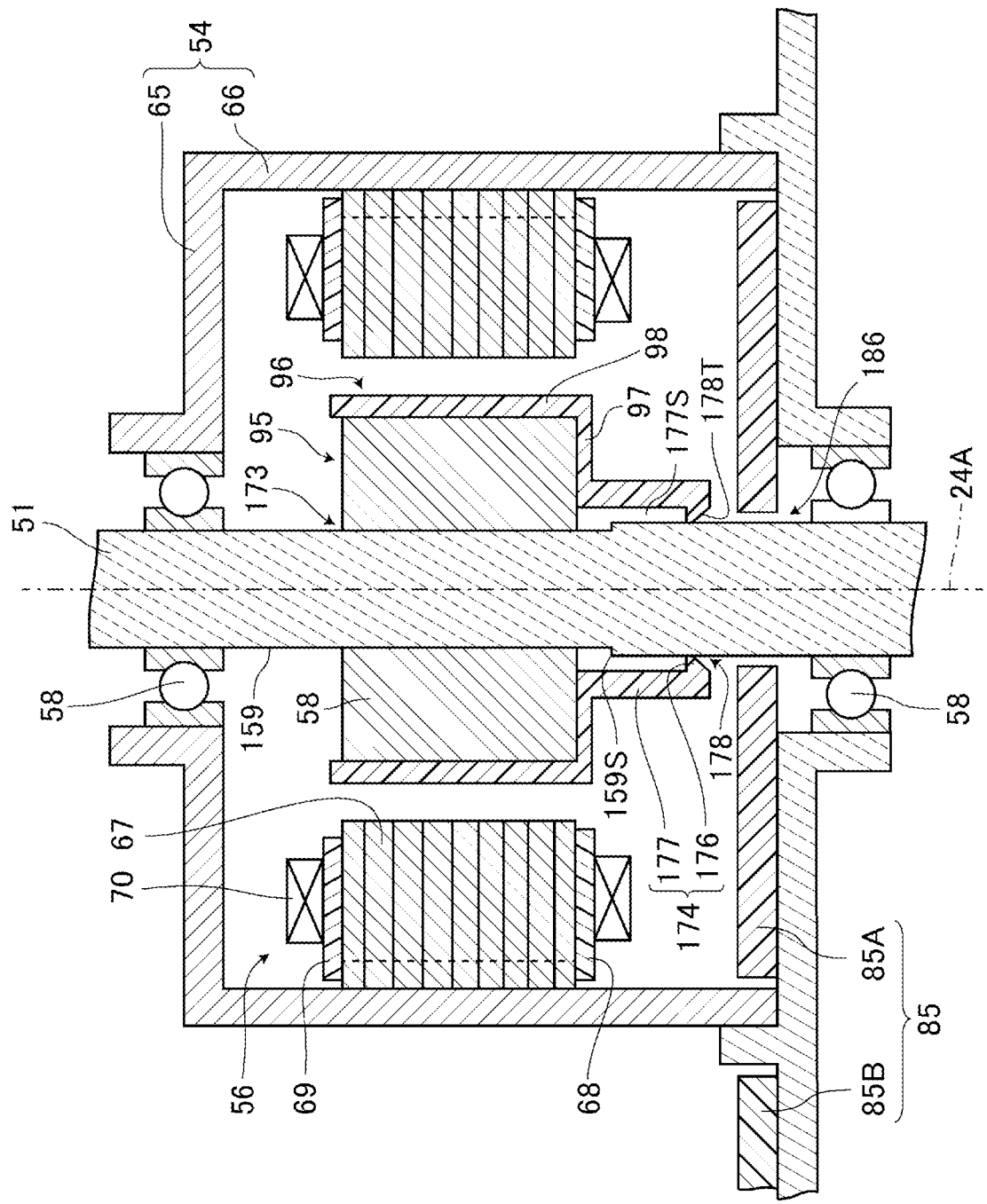
FIG. 5 is a view similar to FIG. 4, showing a motor of a lamp according to a second embodiment of the disclosure.
Figure 6:
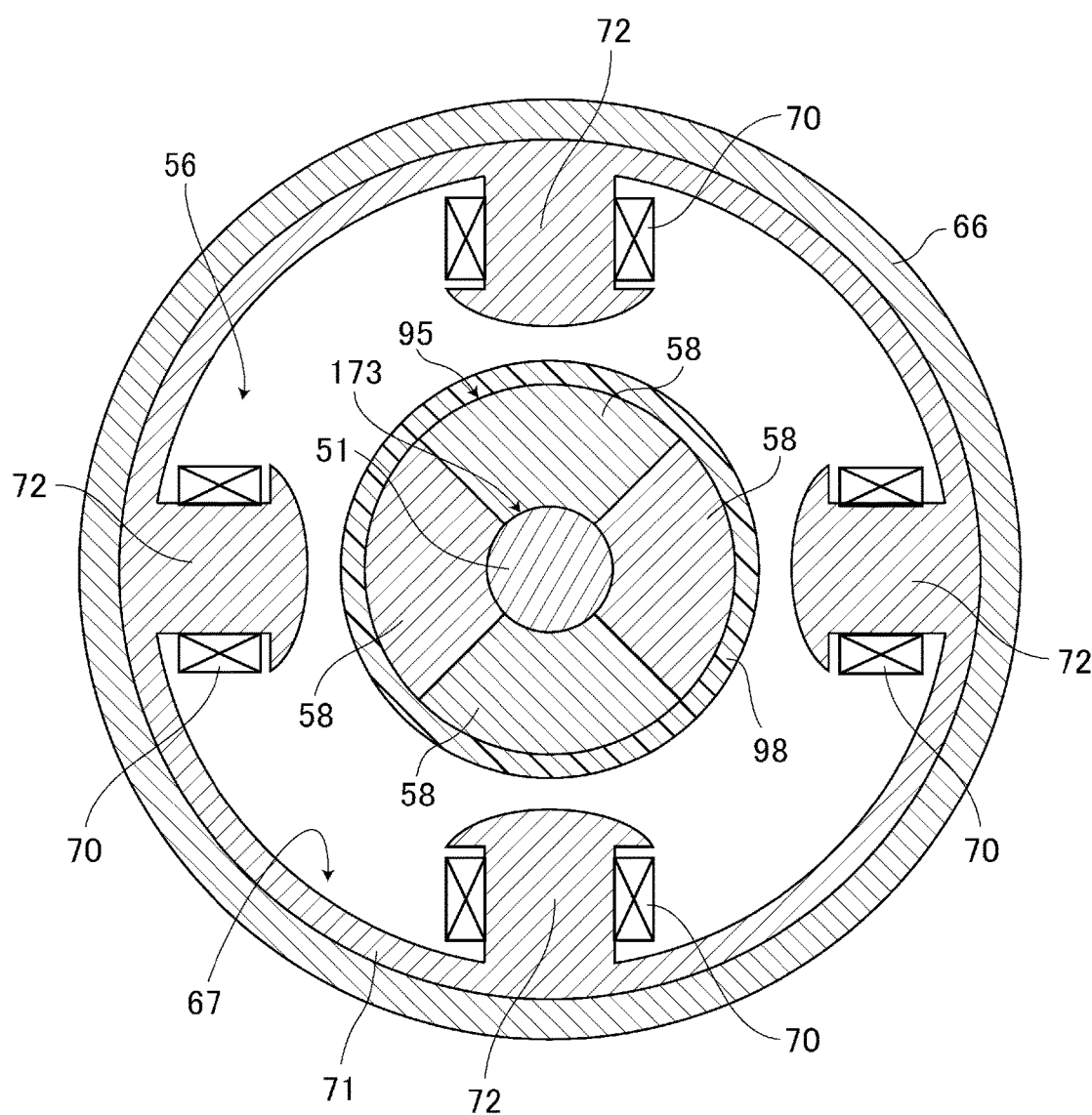
FIG. 6 is a sectional view schematically showing the motor in FIG. 5.

FIG. 5 is a view similar to FIG. 4, showing a motor of a lamp according to the second embodiment, and FIG. 6 is a sectional view schematically showing the motor in FIG. 5. Meanwhile, FIG. 6 is a sectional view perpendicular to the rotation axis 24A of the motor 24. As shown in FIGS. 5 and 6, the motor 24 of the present embodiment is different from the motor 24 of the first embodiment in that it is an inner rotor type brushless motor.

The motor 24 of the present embodiment is an inner rotor type brushless motor and mainly includes the output shaft 51, the outer case 53, the inner case 54, the magnet unit 56, a second magnet unit 95, a covering member 96, a substrate 85A, a substrate 85B, and a pair of radial ball bearing 58.

The output shaft 51 of the present embodiment is a shaft member extending in the direction of the rotation axis 24A of the motor 24. The output shaft 51 is a metallic cylindrical member. The output shaft 51 has a press-fit portion 159 whose outer peripheral surface is scraped from one end side to a predetermined position along the extending direction of the output shaft 51. Therefore, a step 159S serving as a boundary between the press-fit portion 159 and the portion other than the press-fit portion 159 is formed on the outer peripheral surface of the output shaft 51.

The outer case 53 of the present embodiment has the bottom wall 61 and the cylindrical wall 62. In the present embodiment, a through-hole is formed in the bottom wall 61. One of the radial ball bearings 58 is fitted into the through hole, so that this radial ball bearing 58 is fixed to the bottom wall 61. The inner case 54 of the present embodiment has the top wall 65 and the cylindrical wall 66. In the present embodiment, the end of the cylindrical wall 66 on the side opposite to the top wall 65 is fixed to the bottom wall 61 of the outer case 53. Further, a through-hole is formed in the top wall 65. The other of the radial ball bearings 58 is fitted into the through-hole, so that this radial ball bearing 58 is fixed to the bottom wall 61. The output shaft 51 is supported so as to be rotatable with respect to the to outer case 53 and the inner case 54 by the pair of radial ball bearings 58 fixed to the outer case 53 and the inner case 54. One end portion of the output shaft 51 rotatably supported on the outer case 53 and the inner case 54 in this manner protrudes from the top wall 65 of the inner case 54, and the reflector 22 is fixed to the one end portion. Further, the other end portion of the output shaft 51 protrudes from the bottom wall 61 of the outer case 53, and the weight 60 is fixed to the other end portion.

The magnet unit 56 of the present embodiment includes the core 67, the first insulator 68, the second insulator 69, and a plurality of windings the winding 70, and is fixed to the cylindrical wall 66 of the inner case 54. The core 67 of the present embodiment has the cylindrical portion 71 and the protrusions 72. The outer diameter of the cylindrical portion 71 of the present embodiment is substantially the same as the inner diameter of the cylindrical wall 66 of the inner case 54. Each of the plurality of protrusions 72 of the present embodiment has substantially the same configuration and protrudes from the inner peripheral surface of the cylindrical portion 71 by a predetermined length in the radial direction of the cylindrical portion 71. The plurality of protrusions 72 are arranged at substantially equal intervals on the entire circumference of the inner peripheral surface of the cylindrical portion 71. In the present embodiment, four protrusions 72 protrude from the cylindrical portion 71.

The first insulator 68 of the present embodiment is formed of an insulating material. The first insulator 68 is a plate-like member extending along one end face of the core 67 and is attached to the one end face of the core 67. The outer shape of the first insulator 68 substantially coincides with the outer shape of the core 67, and a part of one end face of the protrusion 72 of the core 67 is covered by the first insulator 68. The second insulator 69 of the present embodiment is formed of an insulating material. The second insulator 69 is a plate-like member extending along the other end face of the core 67 and is attached to the other end face of the core 67. The outer shape of the second insulator 69 substantially coincides with the outer shape of the core 67, and a part of one end face of the protrusion 72 of the core 67 is covered by the second insulator 69. The windings 70 of the present embodiment are respectively wound around the protrusions 72 of the core 67 to which the first insulator 68 and the second insulator 69 are attached, and the windings 70 are insulated from the core 67 by the first insulator 68 and the second insulator 69. The core 67 around which the windings 70 are wound in this manner is fitted into the inner case 54 so that the outer peripheral surface of the cylindrical portion 71 of the core 67 is brought into contact with the inner peripheral surface of the inner case 54, and the magnet unit 56 is fixed to the inner case 54.

The second magnet unit 95 of the present embodiment is formed into a cylindrical shape by integrating the plurality of permanent magnets 55 extending in substantially the same direction. A hole defined by the inner peripheral surface of the second magnet unit 95 is a press-fit hole 173. The plurality of permanent magnets 55 are positioned such that magnetic poles of the permanent magnets 55 adjacent to each other in the circumferential direction of the second magnet unit 95 on the side of the outer peripheral surface of the second magnet unit 95 have different positive and negative polarities. The covering member 96 is attached to the second magnet unit 95, and the separation of the plurality of permanent magnets 55 is suppressed by the covering member 96.

The covering member 96 of the present embodiment is formed of, for example, resin. The covering member 96 has a protective member 174, a bottom wall portion 97, and a cylindrical wall portion 98. The protective member 174, the bottom wall portion 97 and the cylindrical wall portion 98 are integrated with each other by integral molding. That is, in the present embodiment, the protective member 174 is a part of the covering member 96. Similar to the protective member 74 of the first insulator 68 of the first embodiment, the protective member 174 of the present embodiment has a contact portion 176 and a collecting portion 177. In the present embodiment, the contact portion 176 is a plate-like member having a substantially circular shape. A through-hole 178 penetrating in a plate thickness direction is formed substantially at the center of the contact portion 176. The contact portion 176 is disposed at a predetermined distance from one end face in the cylindrical axis direction of the second magnet unit 95 such that the cylindrical axis and the center of the through-hole 178 substantially coincide. The minimum diameter of the through-hole 178 is slightly smaller than the outer diameter of the press-fit portion 159 of the output shaft 51. Further, the diameter of the through-hole 178 at the end opposite to the second magnet unit 95 is larger than the outer diameter of the output shaft 51 between the press-fit portion 159 and the portion to which the radial ball bearing 58 attached to the outer case 53 is fixed. Further, the contact portion 176 has a tapered portion 178T in which the diameter of the through-hole 178 is reduced from the end opposite to the second magnet unit 95 toward the second magnet unit 95. Meanwhile, the contact portion 176 may not have such a tapered portion 178T.

The collecting portion 177 of the present embodiment is a cylindrical member which has one end connected along an outer peripheral edge of the contact portion 176 and extends from the contact portion 176 toward the second magnet unit 95. That is, the opening of the collecting portion 177 on the side opposite to the second magnet unit 95 is closed by the contact portion 176 except for the portion corresponding to the through-hole 178 of the contact portion 176. The inner diameter of the collecting portion 177 is larger than the outer diameter of the output shaft 51 between the press-fit portion 159 and the portion to which the radial ball bearing 58 attached to the outer case 53 is fixed, and is smaller than the outer diameter of the second magnet unit 95. The entire circumference of the collecting portion 177 at the end on the side of the second magnet unit 95 is in contact with the end face of the second magnet unit 95. Therefore, the opening at the end of the collecting portion 177 on the side of the second magnet unit 95 is closed by the second magnet unit 95 except for the portion corresponding to the press-fit hole 173 of the second magnet unit 95. An internal space of the collecting portion 177 communicates with the press-fit hole 173.

The bottom wall portion 97 of the present embodiment is a plate-like member which extends from the entire circumference of the outer peripheral surface of the collecting portion 177 at the end opposite to the contact portion 176 to the outer peripheral edge of the second magnet unit 95 along the end face of the second magnet unit 95 in the radial direction of the collecting portion 177. The cylindrical wall portion 98 of the present embodiment is a cylindrical member covering the outer peripheral surface of the second magnet unit 95, and an end thereof on the side of the bottom wall portion 97 is connected to the outer peripheral edge of the bottom wall portion 97. Meanwhile, the covering member 96 may be attached to the second magnet unit 95 by integrally forming the covering member 96 and the second magnet unit 95. For example, the covering member 96 and the second magnet unit 95 may be integrally formed by insert molding in which the second magnet unit 95 is an insert product.

By the way, the second magnet unit 95 of the present embodiment is fixed to the output shaft 51 by press-fitting the press-fit portion 159 of the output shaft 51 into the press-fit hole 73 of the second magnet unit 95. At this time, the output shaft 51 is also inserted into the through-hole 178 and an internal space of the cylindrical wall portion 98 in the covering member 96. Further, in a state where the second magnet unit 95 is fixed to the output shaft 51, the contact portion 176 of the protective member 174 of the covering member 96 is positioned at the portion of the output shaft 51 between the press-fit portion 159 and the portion to which the radial ball bearing 58 attached to the outer case 53 is fixed. At this time, the portion of the inner peripheral surface defining the through-hole 178 formed in the contact portion 176 and having the smallest diameter is in contact with the entire circumference of the outer peripheral surface of the output shaft 51 between the press-fit portion 159 and the portion to which the radial ball bearing 58 attached to the outer case 53 is fixed. Further, the collecting portion 177 is positioned closer to the second magnet unit 95 than the contact portion 176 and surrounds the output shaft 51 while spaced from the outer peripheral surface of the output shaft 51. An opening is formed at an end of the collecting portion 177 on the side of the second magnet unit 95. Therefore, a space 177S is formed between the collecting portion 177 and the output shaft 51. By the way, the entire circumference of the collecting portion 177 at the end on the side of the second magnet unit 95 is in contact with the end face of the second magnet unit 95 on the side of the protective member 174, and the press-fit portion 159 of the output shaft 51 is press-fitted into the press-fit hole 173 of the second magnet unit 95. Therefore, the space 177S is a closed space surrounded by the output shaft 51, the second magnet unit 95, and the protective member 174. Meanwhile, the entire circumference of the collecting portion 177 at the end on the side of the second magnet unit 95 may not be in contact with the end face of the second magnet unit 95 on the side of the protective member 174, and the space 177S may not be a closed space.

The substrate 85A of the present embodiment has a feeding circuit (not shown) to which electric power is supplied, and the substrate 85B has a detection circuit (not shown). A through-hole 186 into which the output shaft 51 is inserted is formed in the substrate 85A. The substrate 85A of the present embodiment is fixed on the bottom wall 61 of the outer case 53 inside the space surrounded by the bottom wall 61 of the outer case 53 and the inner case 54. The substrate 85A fixed in this manner is positioned at a predetermined distance from the second magnet unit 95 in the extending direction of the output shaft 51. The protective member 174 of the covering member 96 is disposed between the second magnet unit 95 and the substrate 85A in the extending direction of the output shaft 51. Further, the substrate 85A overlaps with the second magnet unit 95 as viewed from the extending direction of the output shaft 51. On the other hand, the substrate 85B of the present embodiment is fixed the bottom wall 61 of the outer case 53 outside the space surrounded by the bottom wall 61 of the outer case 53 and the inner case 54. Similar to the feeding circuit of the substrate 85 of the first embodiment, the plurality of windings 70 of the magnet unit 56 are electrically connected to the feeding circuit of the substrate 85A, respectively. Current is applied to each of the windings 70 via this feeding circuit. Further, similar to the detection circuit of the substrate 85 of the first embodiment, the photo-interrupter 88 which is a transmission type optical encoder is mounted on the detection circuit of the substrate 85B.

Similar to the motor 24 of the first embodiment, in the motor 24 of the present embodiment, the direction of the magnetic pole in the magnetic field generated by the windings 70 is changed over time by controlling the direction of current applied to each of the windings 70 in the magnet unit 56. Further, a magnetic force generated between the magnetic field and the permanent magnets 55 of the second magnet unit 95 fixed to the output shaft 51 is used to apply a force in the circumferential direction of the output shaft 51 to the output shaft 51 to which the permanent magnets 55 are fixed. In this way, the output shaft 51 is rotated with respect to the outer case 53 and the inner case 54. As the output shaft 51 is rotated in this manner, the reflector 22 fixed to the output shaft 51 is rotated.

As described above, the motor 24 in the vehicle headlamp 1 of the present embodiment includes the metallic output shaft 51 which is a shaft member extending in the direction of the rotation axis 24A of the motor 24, the second magnet unit 95, the substrate 85A, and the covering member 96 having the protective member 174. The second magnet unit 95 is formed by integrating the plurality of permanent magnets 55. The press-fit hole 173 into which the output shaft 51 is press-fitted is formed in the second magnet unit 95. The substrate 85A is disposed at a predetermined distance from the second magnet unit 95 in the extending direction of the output shaft 51, and electric power is supplied to the feeding circuit of the substrate 85A. The protective member 174 of the covering member 96 has the contact portion 176 in which the through-hole 178 is formed. The output shaft 51 is inserted into the through-hole 178. The protective member 174 is disposed between the second magnet unit 95 and the substrate 85A in the extending direction of the output shaft 51. The contact portion 176 of the protective member 174 is in contact with the outer peripheral surface of the output shaft 51 over the entire circumference.

In the motor 24 in the vehicle headlamp 1 of the present embodiment, as described above, the protective member 174 is disposed between the second magnet unit 95 and the substrate 85A in the extending direction of the output shaft 51, and the contact portion 176 of the protective member 174 is in contact with the outer peripheral surface of the output shaft 51 over the entire circumference. Therefore, similar to the first embodiment, shavings generated when the output shaft 51 is press-fitted into the press-fit hole 173 of the second magnet unit 95 and the outer peripheral surface of the output shaft 51 and the inner peripheral surface defining the press-fit hole 173 of the second magnet unit 95 are scraped are received by the protective member 174, so that it is possible to prevent the shavings from contacting a conducting wire or the like of the substrate 85A. In this way, the occurrence of a short circuit on the substrate 85A caused by the shavings can be suppressed. For example, it is possible to suppress malfunction such as that the output shaft 51 of the motor 24 does not rotate.

In the present embodiment, as described above, the diameter of the through-hole 178 is slightly smaller than the outer diameter of the press-fit portion 159 of the output shaft 51. Therefore, the protective member 174 is elastically deformed so that the diameter of the through-hole 178 is widened, and the contact portion 176 of the protective member 174 is brought into close contact with the outer peripheral surface of the output shaft 51 by the elastic force of the protective member 174. In this way, even when the protective member 174 is deformed due to heat or aged deterioration or the like, the formation of a gap between the contact portion 176 of the protective member 174 and the outer peripheral surface of the output shaft 51 can be suppressed, and the occurrence of a short circuit on the substrate 85A caused by the shavings can be suppressed.

In the present embodiment, the diameter of the through-hole 178 at the end opposite to the second magnet unit 95 is larger than the outer diameter of the output shaft 51 between the press-fit portion 159 and the portion to which the radial ball bearing 58 attached to the outer case 53 is fixed. Further, the contact portion 176 has the tapered portion 178T in which the diameter of the through-hole 178 is reduced from the end opposite to the second magnet unit 95 toward the second magnet unit 95. Therefore, as compared to the case where the protective member 174 does not have the tapered portion 178T, when the output shaft 51 in which the step 159S is formed is inserted into the through-hole 178 of the contact portion 176 of the protective member 174, it is difficult for the protective member 174 to catch on the step 159S and the output shaft 51 can be easily inserted into the through-hole 178 of the contact portion 176 of the protective member 174. As a result, the productivity of the motor can be improved.

In the present embodiment, the protective member 174 has the collecting portion 177. The collecting portion 177 surrounds the output shaft 51 while spaced from the outer peripheral surface of the output shaft 51 on the side of the second magnet unit 95 from the contact portion 176 with which the outer peripheral surface of the output shaft 51 is in contact, and an opening is formed at the end of the collecting portion 177 on the side of the second magnet unit 95. Therefore, as described above, the space 177S is formed between the collecting portion 177 of the protective member 174 and the output shaft 51. Further, since the opening is formed at the end of the collecting portion 177 on the side of the second magnet unit 95, the shavings can be trapped in the space 177S between the collecting portion 177 and the output shaft 51 via the opening and can be retained in the space 177S. Therefore, even when the output shaft 51 or the like of the motor 24 is rotated and the shavings are rolled up by this rotation, it is possible to prevent the shavings from contacting a conducting wire or the like of the substrate 85A. As a result, as compared to the case where the space 177S is not formed, the occurrence of a short circuit on the substrate 85A caused by the shavings can be further suppressed.

In the present embodiment, the entire circumference of the collecting portion 177 at the end on the side of the second magnet unit 95 is in contact with the end face of the second magnet unit 95 on the side of the protective member 174, and the press-fit portion 159 of the output shaft 51 is press-fitted into the press-fit hole 173 of the second magnet unit 95. Therefore, the space 177S is a closed space surrounded by the output shaft 51, the second magnet unit 95, and the protective member 174. As a result, as compared to the case where the space 177S is not a closed space, the shavings retained in the space 177S can be prevented from leaving the space 177S, so that the occurrence of a short circuit on the substrate 85A caused by the shavings can be further suppressed.

In the present embodiment, the protective member 174 is a part of the covering member 96 attached to the second magnet unit 95. Therefore, the protective member 174 also serves as a part of the covering member 96 for restraining the separation of the plurality of permanent magnets 55. As a result, as compared to the case where the protective member 174 and the covering member 96 are formed separately, the number of parts can be reduced and the cost of the motor 24 can be reduced.

In the present embodiment, as described above, the diameter of the through-hole 178 is slightly smaller than the outer diameter of the press-fit portion 159 of the output shaft 51. Therefore, in an initial state where the press-fit portion 159 of the output shaft 51 is press-fitted into the press-fit hole 173 of the second magnet unit 95, the contact portion 176 of the protective member 174 can be maintained in a state of being in contact with the outer peripheral surface of the press-fit portion 159 of the output shaft 51. In a state where the press-fitting progresses and the contact portion 176 of the protective member 174 is positioned between the press-fit portion 159 of the output shaft 51 and the portion to which the radial ball bearing 58 attached to the outer case 53 is fixed, the contact portion 176 can be maintained in a state of being in contact with the entire circumference of the outer peripheral surface on the side of the bottom wall 61 of the outer case 53 from the press-fit portion 159 of the output shaft 51. Therefore, while the press-fit portion 159 of the output shaft 51 is press-fitted into the press-fit hole 173 of the second magnet unit 95, the contact portion 176 can be maintained in a state of being in contact with the outer peripheral surface of the output shaft 51 over the entire circumference. As a result, it is possible to further prevent the shavings from contacting a conducting wire or the like of the substrate 85A, and the occurrence of a short circuit on the substrate 85A caused by the shavings can be further suppressed.

Although the disclosure has been described with reference to the embodiments, the disclosure is not limited thereto.

In the above embodiment, the vehicle headlamp 1 has been described as an example. However, the lamp of the disclosure is not limited to the vehicle lamp. For example, the lamp may be configured to reflect light emitted from the light source by the reflector while rotating the reflector by the motor.

Further, in the above embodiment, the reflector 22 including the boss 41, the skirt 42, and the two reflecting blades 43 has been described as an example. However, the number of the reflecting blades included in the reflector is not particularly limited. The number of the reflecting blades included in the reflector may be one or three or more. Further, the reflector may not include the skirt 42. In such a case, for example, an encoder for detecting the rotational position of the inner case 54 or the output shaft 51 is provided in the motor 24. By adopting such a configuration, the encoder can indirectly detect the rotational position of the reflector 22 based on the rotational position of the inner case 54 or the output shaft 51 and can adjust the intensity of light emitted from the light source 21 according to the rotation of the reflector 22.

Further, in the above embodiment, the reflector 22 is fixed to the end portion of the output shaft 51 on the side of the top wall 65 of the inner case 54, and the weight 60 is fixed to the end portion of the output shaft 51 on the side of the bottom wall 61 of the outer case 53. However, the reflector 22 may be fixed to the end portion of the output shaft 51 on the side of the bottom wall 61 of the outer case 53, and the weight 60 may be fixed to the end portion of the output shaft 51 on the side of the top wall 65 of the inner case 54.

Further, in the above embodiment, the motor 24 as a brushless motor has been described as an example. However, the motor may be a brushed motor.

Further, in the first embodiment, the bearing part 52 including the metallic cylindrical holder 57 and the pair of radial ball bearings 58 has been described as an example. However, the bearing part may be configured to rotatably support the output shaft, and at least a part thereof may be made of metal. For example, the holder of the bearing part may be a rectangular tubular member or may be a member having no through-hole. The inner peripheral surface side of the holder of the bearing may be formed of a material different from metal, for example, resin or the like.

Further, in the first embodiment, the contact portion 76 is brought into close contact with the outer peripheral surface of the holder 57 by the elastic force of the protective member 74 which is elastically deformed so that the diameter of the through-hole 78 is widened. Further, in the second embodiment, the contact portion 176 is brought into close contact with the outer peripheral surface of the output shaft 51 by the elastic force of the protective member 174 which is elastically deformed so that the diameter of the through-hole 178 is widened. However, the protective member may be brought into close contact with the holder 57 (or the outer shaft 51) by an elastic force of a separate member. For example, an elastic body made of rubber or the like and formed in an annular shape may be attached to the collecting portions 77, 177 of the protective members 74, 174 in a state where its diameter is widened, and the contact portions 76, 176 of the protective members 74, 174 may be brought into close contact with the holder 57 (or the outer shaft 51) by an elastic force of the annular elastic body which is about to contract.

Further, in the above embodiment, the first insulator 68 and the second insulator 69 which do not cover the side surface of the core 67 have been described as an example. However, the first insulator and the second insulator may cover at least a part of the end face of the core in the extending direction of the output shaft and may be in a state where the windings and the core are insulated. For example, the first insulator and the second insulator may also be configured to cover the side surface of the core 67. The first insulator and the second insulator may be integrated with each other by integral molding. In such a case, the core 67, the first insulator and the second insulator can be integrally molded by insert molding in which the core 67 is an insert product, so that the first insulator and the second insulator can be integrated with each other.

Further, in the first embodiment, the cylindrical collecting portion 77 has been described as an example, and in the second embodiment, the cylindrical collecting portion 177 has been described as an example. However, the collecting portion 77 may surround the holder 57 while spaced from the outer peripheral surface of the holder 57 on the side of the core 67 from the contact portion 76 with which the outer peripheral surface of the holder 57 as the shaft member is in contact, and an opening may be formed at an end of the collecting portion 77 on the side of the core 67. Further, the collecting portion 177 may surround the output shaft 51 while spaced from the outer peripheral surface of the output shaft 51 on the side of the second magnet unit 95 from the contact portion 176 with which the outer peripheral surface of the output shaft 51 as the shaft member is in contact, and an opening may be formed at an end of the collecting portion 177 on the side of the second magnet unit 95. For example, the inner diameter and the outer diameter of the collecting portions 77, 177 may change in the extending direction of the output shaft 51, and the collecting portions 77, 177 may be formed in rectangular tubular shapes.

Further, in the first embodiment, the first insulator 68 which includes the protective member 74 and the covering portion 75 and in which the protective member 74 and the covering portion 75 are integrated with each other by integral molding has been described as an example. However, the protective member 74 and the covering portion 75 may be formed separately. In such a case, the protective member 74 may not be connected to the covering portion 75 and may not have the collecting portion 77. The protective member 74 may be fixed to the holder 57 before being press-fitted into the press-fit hole 73 of the core 67. Even with such a configuration, the shavings generated when the holder 57 is press-fitted into the press-fit hole 73 of the core 67 can be received by the protective member, so that the occurrence of a short circuit on the substrate 85 caused by the shavings can be suppressed.

Further, in the second embodiment, the covering member 96 which includes the protective member 174, the bottom wall portion 97 and the cylindrical wall portion 98 and in which the protective member 174, the bottom wall portion 97 and the cylindrical wall portion 98 are integrated with each other by integral molding has been described as an example. However, the protective member 174, the bottom wall portion 97 and the cylindrical wall portion 98 may be formed separately. In such a case, the protective member 174 may not be connected to the bottom wall portion 97 and may not have the collecting portion 177. The protective member 174 may be fixed to the output shaft 51 before being press-fitted into the press-fit hole 173 of the second magnet unit 95. Even with such a configuration, the shavings generated when the output shaft 51 is press-fitted into the press-fit hole 173 of the second magnet unit 95 can be received by the protective member, so that the occurrence of a short circuit on the substrate 85A caused by the shavings can be suppressed.

Further, in the first embodiment, the second insulator 69 which has the cylindrical wall portion 79 and the covering portion 80 has been described as an example. However, the second insulator may have the protective member 74 of the first insulator 68 instead of the cylindrical wall portion 79. By adopting such a configuration, the shavings generated when the holder 57 is press-fitted into the press-fit hole 73 of the core 67 can be received by the protective member 74 of the first insulator and the protective member of the second insulator. Therefore, as compared with the case where the protective member of the second insulator is not provided, the occurrence of a short circuit on the substrate 85 caused by the shavings can be further suppressed.

Further, in the first embodiment, the contact portion 76 of the protective member 74 is in contact with the outer peripheral surface of the holder 57 over the entire circumference. However, the protective member 74 may be in contact with at least a part of the outer peripheral surface of the holder 57 and the contact portion 76 of the protective member 74 may not be partially in contact with the outer peripheral surface of the holder 57 in the circumferential direction of the holder 57. However, from the viewpoint of further suppressing the occurrence of a short circuit on the substrate 85 caused by shavings, it is preferable that the contact portion 76 of the protective member 74 is in contact with the outer peripheral surface of the holder 57 over the entire circumference.

Further, in the second embodiment, the contact portion 176 of the protective member 174 is in contact with the outer peripheral surface of the output shaft 51 over the entire circumference. However, the protective member 174 may be in contact with at least a part of the outer peripheral surface of the output shaft 51 and the contact portion 176 of the protective member 174 may not be partially in contact with the outer peripheral surface of the output shaft 51 in the circumferential direction of the output shaft 51. However, from the viewpoint of further suppressing the occurrence of a short circuit on the substrate 85A caused by shavings, it is preferable that the contact portion 176 of the protective member 174 is in contact with the outer peripheral surface of the output shaft 51 over the entire circumference.

Further, in the first embodiment, the holder 57 having the press-fit portion 59 has been described as an example, and in the second embodiment, the output shaft 51 having the press-fit portion 159 has been described as an example. However, the holder and the output shaft may not have the press-fit portion.

Further, in the first embodiment, the substrate 85 overlapping with the core 67 of the magnet unit 56 as viewed from the extending direction of the output shaft 51 has been described as an example. Further, in the second embodiment, the substrate 85A overlapping with the second magnet unit 95 as viewed from the extending direction of the output shaft 51 has been described as an example. However, the substrate may be disposed at a predetermined distance from the core 67 of the magnet unit 56 or the second magnet unit 95 in the extending direction of the output shaft 51, and the substrate may not overlap with the core 67 of the magnet unit 56 or the second magnet unit 95 as viewed from the extending direction of the output shaft 51.

According to the disclosure, the motor capable of suppressing malfunction and the lamp using the motor are provided. The motor and the lamp can be used in the field of illumination or the like.

What is claimed is:

1. A motor comprising:
    a shaft member in which at least a part of an outer peripheral surface is made of metal;
    a magnet unit which is configured by integrating a plurality of magnets and in which a press-fit hole into which the shaft member is press-fitted is formed;
    a substrate which is disposed at a predetermined distance from the magnet unit in an extending direction of the shaft member and to which electric power is supplied; and
    a protective member in which a through-hole into which the shaft member is inserted is formed and which is disposed directly between the magnet unit and the substrate in the extending direction of the shaft member,
    wherein the protective member is in contact with at least a part of the outer peripheral surface of the shaft member.

2. The motor according to claim 1,
    wherein the protective member is brought into close contact with the outer peripheral surface of the shaft member by an elastic force.

3. The motor according to claim 1,
    wherein a diameter of the through-hole at an end opposite to the magnet unit is larger than an outer diameter of the shaft member, and wherein the protective member has a tapered portion in which the diameter of the through-hole is reduced from the end opposite to the magnet unit toward the magnet unit.

4. The motor according to any one of claim 1, wherein the protective member has a collecting portion which surrounds the shaft member while spaced from the outer peripheral surface of the shaft member on the side of the magnet unit from the portion with which the outer peripheral surface of the shaft member is in contact, and in which an opening is formed at an end on the side of the magnet unit.

5. The motor according to claim 1, wherein the substrate overlaps with the magnet unit as viewed from the extending direction of the shaft member.

6. A motor comprising:
an output shaft;
a bearing part, comprising at least one bearing and a holder disposed around the at least one bearing, which is configured to rotatably support the output shaft and in which at least a part of an outer peripheral surface is made of metal;
a metallic core in which a press-fit hole into which the bearing part is press-fitted is formed;
a substrate which is disposed at a predetermined distance from the core in an extending direction of the output shaft and to which electric power is supplied; and
a protective member in which a through-hole into which the bearing part is inserted is formed and which is disposed between the core and the substrate in the extending direction of the output shaft,
wherein the protective member is in contact with an entire outer circumferential surface of the holder;
wherein a diameter of the through-hole at an end opposite to the core is larger than an outer diameter of the holder; and wherein the protective member has a tapered portion in which the diameter of the through-hole is reduced from the end opposite to the core toward the core.

7. The motor according to claim 6, wherein the protective member is brought into close contact with the outer peripheral surface of the holder by an elastic force.

8. The motor according to claim 6, wherein the protective member has a collecting portion which surrounds the bearing part while spaced from the outer peripheral surface of the holder on the side of the core from the portion with which the outer peripheral surface of the holder is in contact, and in which an opening is formed at an end on the side of the core.

9. The motor according to claim 6, wherein the protective member is a part of an insulator formed of an insulating material covering at least a part of an end face of the core on the side of the substrate.

10. The motor according to claim 6, wherein the substrate overlaps with the core as viewed from the extending direction of the output shaft.

11. A lamp comprising:
a light source;
a reflector; and
a motor configured to rotate the reflector,
wherein the reflector is configured to reflect light emitted from the light source while rotating, and
wherein the motor is the motor according to claim 1.

12. The motor according to claim 1, further comprising:
a bearing part which rotatably supports the shaft member.

13. The motor according to claim 1, further comprising a bearing part which rotatably supports the shaft member,
wherein the bearing part includes a first portion having a part which is in contact with the protective member and a second portion having an outer diameter which is smaller than an outer diameter of the first portion; and
wherein a step is formed between the first portion and the second portion.

* * * * *